(12) United States Patent
Dohi et al.

(10) Patent No.: US 12,259,015 B2
(45) Date of Patent: Mar. 25, 2025

(54) REVERSE-INPUT BLOCKING CLUTCH AND MANUFACTURING METHOD THEREOF

(71) Applicant: NSK Ltd., Tokyo (JP)

(72) Inventors: Nagao Dohi, Fujisawa (JP); Shohei Kaneko, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/287,951

(22) PCT Filed: Dec. 27, 2022

(86) PCT No.: PCT/JP2022/048382
§ 371 (c)(1),
(2) Date: Oct. 23, 2023

(87) PCT Pub. No.: WO2023/136149
PCT Pub. Date: Jul. 20, 2023

(65) Prior Publication Data
US 2024/0200617 A1  Jun. 20, 2024

(30) Foreign Application Priority Data

Jan. 14, 2022 (JP) ................................ 2022-004648

(51) Int. Cl.
*F16D 43/21* (2006.01)
*F16D 3/50* (2006.01)
(Continued)

(52) U.S. Cl.
CPC .............. *F16D 43/211* (2013.01); *F16D 3/50* (2013.01); *F16D 51/12* (2013.01); *F16D 59/00* (2013.01);
(Continued)

(58) Field of Classification Search
CPC . F16D 3/02; F16D 3/50; F16D 41/063; F16D 41/10; F16D 43/02; F16D 43/211;
(Continued)

(56) References Cited

U.S. PATENT DOCUMENTS

| 1,617,745 A | * | 2/1927 | Cousinard | ................. F16D 3/50 |
| | | | | 192/223.3 |
| 3,051,282 A | * | 8/1962 | Greene | ..................... F16D 3/50 |
| | | | | 74/530 |

(Continued)

FOREIGN PATENT DOCUMENTS

| EP | 4 006 371 A1 | 6/2022 |
| JP | 2019-138410 A | 8/2019 |

(Continued)

OTHER PUBLICATIONS

International Search Report for PCT/JP2022/048382 dated Mar. 14, 2023.

*Primary Examiner* — Richard M Lorence
(74) *Attorney, Agent, or Firm* — Sughrue Mion, PLLC

(57) ABSTRACT

A reverse-input blocking clutch includes a pressed member having a pressed surface; an input member having an input-side engaging portion; an output member having an output-side engaging portion; an engaging element having a pressing surface, an input-side engaged portion, and an output-side engaged portion and arranged between the pressed surface and the output-side engaging portion with respect to a first direction which is a direction of moving toward or away from the pressed surface; an elastic member that elastically urge the pressing surface toward the pressed surface 7 in the first direction; and a displacement prevention means for preventing relative displacement in the axial direction of the engaging element with respires to the output member.

5 Claims, 15 Drawing Sheets

(51) Int. Cl.
*F16D 51/12* (2006.01)
*F16D 59/00* (2006.01)
*F16D 67/00* (2006.01)

(52) U.S. Cl.
CPC ...... *F16D 67/00* (2013.01); *F16D 2250/0084* (2013.01)

(58) Field of Classification Search
CPC .......... F16D 51/12; F16D 51/50; F16D 67/00; F16D 67/02; F16D 2250/0084; F16D 59/00; Y10T 29/4984; Y10T 29/49904
See application file for complete search history.

(56) References Cited

U.S. PATENT DOCUMENTS

2021/0262532 A1* 8/2021 Toyoda ................... F16D 43/26
2021/0277964 A1 9/2021 Daikoku et al.

FOREIGN PATENT DOCUMENTS

WO 2019/216280 A1 11/2019
WO 2021/107073 A1 6/2021

* cited by examiner

REVERSE-INPUT BLOCKING CLUTCH AND MANUFACTURING METHOD THEREOF

CROSS REFERENCE TO RELATED APPLICATIONS

This application is a National Stage of International Application No. PCT/JP2022/048382 filed Dec. 27, 2022, claiming priority based on Japanese Patent Application No. 2022-004648 filed Jan. 14, 2022.

TECHNICAL FIELD

The present disclosure relates to a reverse-input blocking clutch that transmits rotational torque input to an input member to an output member while completely blocking rotational torque reversely input to the output member or transmitting only a part of the rotational torque reversely input to the output member to the input member and blocking the remaining part.

BACKGROUND ART

The reverse-input blocking clutch includes an input member connected to an input-side mechanism such as a drive source and an output member connected to an output-side mechanism such as a speed-reducing mechanism, and has a function of transmitting rotational torque input to the input member to the output member while completely blocking rotational torque reversely input to the output member and not transmitting it to the input member, alternatively, transmitting only a part of the rotational torque reversely input to the output member to the input member and blocking the remaining part.

Reverse-input blocking clutches are roughly classified into lock type reverse-input blocking clutches and free type reverse-input blocking clutches depending on the difference in the mechanism for blocking rotational torque reversely input to the output member. Lock type reverse-input blocking clutches include a mechanism that prevents rotation of an output member when rotational torque is reversely input to the output member. On the other hand, free type reverse-input blocking clutches include a mechanism that idles an output member when rotational torque is input to the output member. Which of the lock type reverse-input blocking clutches and the free type reverse-input blocking clutches are to be used is appropriately determined depending on the use of a device incorporating a reverse-input blocking clutch.

WO2021/107073 describes a lock type reverse-input blocking clutch. The reverse-input blocking clutch described in WO2021/107073 include a pressed member having a pressed surface, an input member having input-side engaging portions, an output member having output-side engaging portions, a pair of engaging elements having input-side engaged portions, output-side engaged portions, and pressing surfaces, and elastic members.

When rotational torque is input to the input member, the pair of engaging elements displace in a direction away from the pressed surface based on engagement of the input-side engaging portions with the input-side engaged portions, and rotational torque input to the input member is transmitted to the output member by engaging the output-side engaged portions with the output-side engaging portions.

On the other hand, when rotational torque is reversely input to the output member, the pair of engaging elements press the pressing surfaces against the pressed surface based on engagement of the output-side engaging portions with the output-side engaged portions so as to frictionally engage the pressing surfaces with the pressed surface. As a result, the rotational torque reversely input to the output member is completely blocked and not transmitted to the input member, alternatively, only a part of the rotational torque reversely input to the output member is transmitted to the input member and blocking the remaining part.

The elastic members are arranged at positions overlapping the output-side engaging portions in a first direction which is a direction of movement of the pressing surfaces when moving toward or away from the pressed surface, and are elastically held between the output-side engaging portions and the pair of engaging elements. That is, based on its own elastic restoring force, the elastic members urge the pair of engaging elements in a direction that brings the pressing surfaces closer to the pressed surface in the first direction.

Similar to the reverse-input blocking clutch described in WO2021/107073, the reverse-input blocking clutch including elastic members can suppress looseness of the output member.

CITATION LIST

Patent Literature

Patent Literature 1: WO2021/107073

SUMMARY OF THE INVENTION

Technical Problem

From the view point of improving the assembly efficiency, a reverse-input blocking clutch including an elastic member has room for improvement.

When assembling a reverse-input blocking clutch including an elastic member, for example, a pair of engaging elements, an input member, and an elastic member configured by a pair of leaf springs, an input-side radial rolling bearing, and an input-side housing element are assembled to obtain an input-side assembly. Further, an output-side assembly is obtained by combining an output member, an output-side radial rolling bearing, and an output-side housing element. By bringing the input-side assembly and the output-side assembly closer to each other in the axial direction, the output-side engaging portions of the output member are inserted between the pair of leaf springs while the input-side housing element and the output-side housing element being coupled and fixed to each other to configure a pressed member so as to obtain a reverse-input blocking clutch.

In such an assembling method, it is troublesome to insert the output-side engaging portions between the pair of leaf springs since it is not possible to visually confirm the pair of leaf springs and the output-side engaging portions from the outside, so that the assembly cost may be increased.

Further, in the reverse-input blocking clutch having the construction as described above, the pair of leaf springs are only elastically held between the pair of engaging elements and the output-side engaging portions and are not supported by any member so as not to fall off. Therefore, in a state before inserting the output-side engaging portions between the pair of leaf springs, there is a possibility that each leaf spring of the pair of leaf springs moves toward each other such that the distance between the leaf springs becomes narrower. From this point of view as well, the work of inserting the output-side engaging portions between the pair of leaf springs becomes troublesome.

Here, by providing tapered portions in which the thickness in the radial direction becomes smaller toward the tip end sides at tip end portions of the output-side engaging portions, the work of inserting the output-side engaging portions between the pair of leaf springs may be facilitated. However, in this case, the dimension in the axial direction of the output member becomes large, and the reverse-input blocking clutch becomes large accordingly.

An object of the present disclosure is to achieve a construction of a reverse-input blocking clutch capable of improving the assembly efficiency and an assembling method thereof.

Solution to Problem

The reverse-input blocking clutch according to one aspect of the present disclosure includes a pressed member, an input member, an output member, an engaging element, an elastic member, and a displacement prevention means. As a preferred aspect, a pair of engaging elements can be provided as the engaging element, and a pair of input-side engaging portions can be provided as an input-side engaging portion of the input member.

The pressed member has a pressed surface on an inner peripheral surface thereof.

The input member has at least one input-side engaging portion arranged on inside in a radial direction of the pressed surface and is coaxially arranged with the pressed surface.

The output member has an output-side engaging portion arranged on inside in the radial direction of the pressed surface and on inside in the radial direction of the input-side engaging portion, is arranged coaxially with the pressed surface, and is rotatably supported inside the pressed member.

The engaging element has a pressing surface facing the pressed surface, an input-side engaged portion engageable with the input-side engaging portion, and an output-side engaged portion engageable with the output-side engaging portion, and is arranged between the pressed surface and the output-side engaging portion with regard to a first direction which is a direction moving toward or away from the pressed surface so as to move in the first direction.

The elastic member elastically urges the engaging element in a direction that brings the pressing surface closer to the pressed surface with regard to the first direction.

The displacement prevention means prevents relative displacement with regard to an axial direction of the engaging element with respect to the output member.

When rotational torque is input to the input member, the engaging element displaces in a direction moving away from the pressed surface with regard to the first direction based on the input-side engaging portion engaging with the input-side engaged portion, and transmit rotational torque input to the input member to the output member by engaging the output-side engaged portion with the output-side engaging portion, and when rotational torque is reversely input to the output member, the engaging element presses the pressing surface against the pressed surface so as to frictionally engage the pressing surface with the pressed surface based on the output-side engaging portion engaging with the output-side engaged portion.

In the reverse-input blocking clutch according to one aspect of the present disclosure, the displacement prevention means can have a stopper member that is locked to the output member and faces a side surface in the axial direction of the engaging element directly or through the other member such as a spacer.

The stopper member can be configured by, for example, a retaining ring, a speed nut, or a bush nut. However, alternatively or additionally, the other member such as a spacer can also be used as the displacement prevention means.

In the reverse-input blocking clutch according to one aspect of the present disclosure, the elastic member can be configured by a leaf spring that is elastically held between the output-side engaging portion and the engaging element.

In the reverse-input blocking clutch according to one aspect of the present disclosure, the pressed member can have an output-side housing element that rotatably supports the output member inside thereof and has the pressed surface on an inner peripheral surface thereof, and an input-side housing element that rotatably supports the input member inside thereof and is coupled and fixed to the output-side housing element.

In a method for assembling a reverse-input blocking clutch according to one aspect of the present disclosure, when assembling the reverse-input blocking clutch according to one aspect of the present disclosure, the output member is rotatably supported inside the pressed member, the engaging element is arranged between the pressed surface and the output-side engaging portion, and relative displacement in the axial direction of the engaging element with respect to the output member is prevented by the displacement prevention means, and the engaging element is elastically urged in a direction that brings the pressing surface closer to the pressed surface with regard to the first direction by the elastic member, and in this state, the input member and the output member are moved in a direction toward each other with regard to the axial direction so as to engage the input-side engaging portion with the input-side engaged portion.

Effect of Invention

With the construction of the reverse-input blocking clutch and the assembling method according to one aspect of the present disclosure, efficiency of assembling a reverse-input blocking clutch including an elastic member can be improved.

DESCRIPTION OF THE EMBODIMENTS

Figure 1:
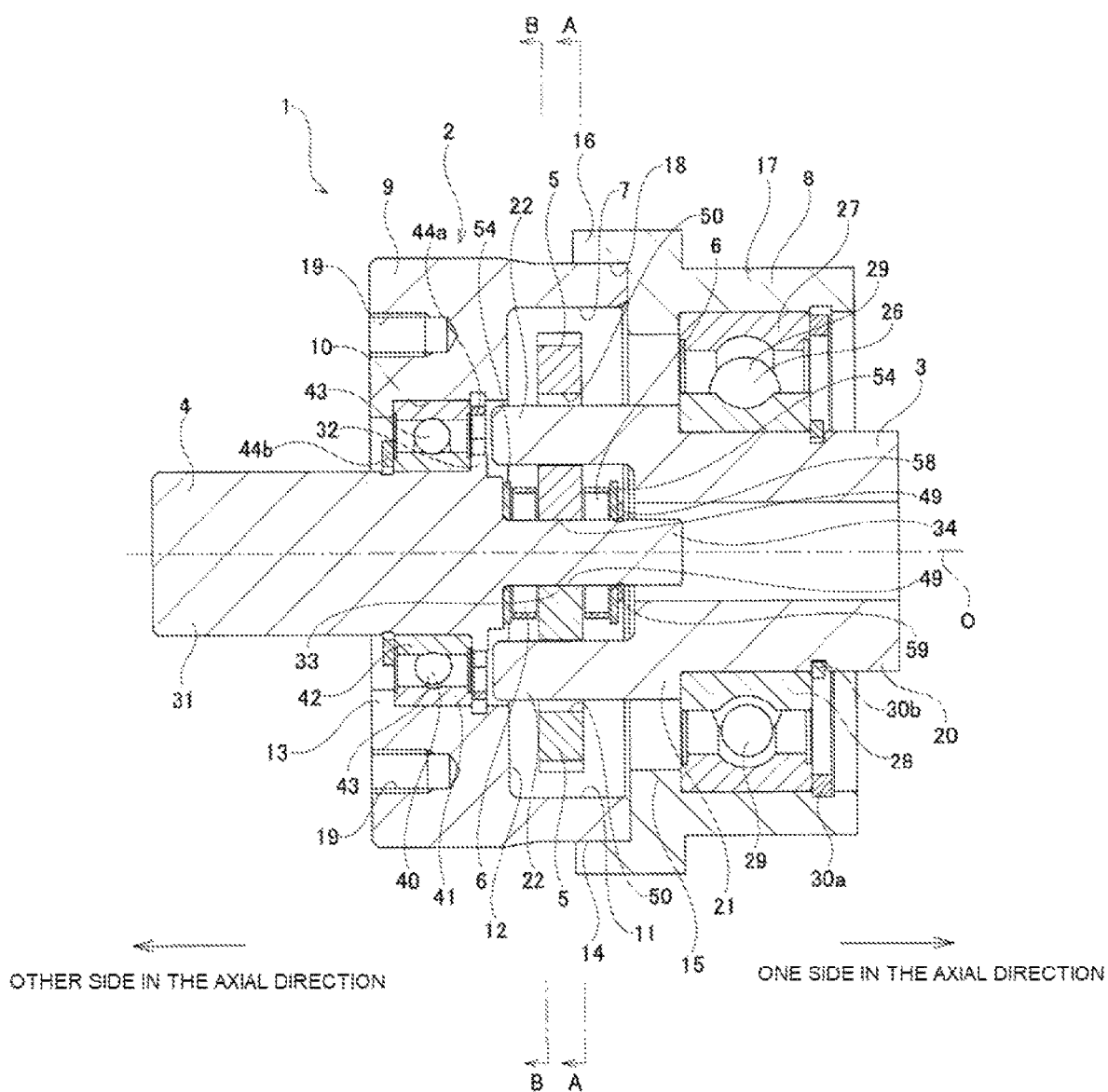
FIG. 1 is a cross-sectional view of a reverse-input blocking clutch of an example of an embodiment of the present disclosure.

FIG. 1 to FIG. 12 illustrate a reverse-input blocking clutch 1 of an example of an embodiment of the present disclosure. Here, axial direction, radial direction, and circumferential direction refer to the axial direction, radial direction, and circumferential direction of the reverse-input blocking clutch 1, unless otherwise specified. In this example, the axial direction, radial direction, and circumferential direction of the reverse-input blocking clutch 1 coincide with the axial direction, radial direction, and circumferential direction of the input member 3, and the axial direction, radial direction, and circumferential direction of the output member 4. Further, one side in the axial direction refers to the input member 3 side (right side in FIG. 1), and the other side in the axial direction refers to the output member 4 side (left side in FIG. 1).

<Explanation of Structure of Reverse-Input Blocking Clutch>

The reverse-input blocking clutch 1 of this example includes a pressed member 2, an input member 3, an output member 4, an engaging element 5, and an elastic member 6. The reverse-input blocking clutch 1 has a reverse input blocking function of transmitting rotational torque input to the input member 3 to the output member 4, while completely blocking rotational torque reversely input to the output member 4 and not transmitting it to the input member 3, or transmitting only a part of the rotational torque reversely input to the output member 4 to the input member 3 and blocking the remaining part.

In the reverse-input blocking clutch of the present disclosure, materials of the input member, the output member, the pressed member, and the engaging element are not particularly limited. For example, as these materials, in addition to metals such as iron alloys, copper alloys, and aluminum alloys, synthetic resins mixed with reinforcing fibers as necessary can be applied. Further, the input member, the output member, the pressed member, and the engaging element can be made of the same material, or can be made of different materials.

The pressed member 2 is supported and fixed to a fixed portion and does not rotate when the reverse-input blocking clutch 1 is used. Further, the pressed member 2 has a pressed surface 7 which is a cylindrical concave surface on an inner peripheral surface of an intermediate portion in the axial direction. In this example, the pressed member 2 includes an input-side housing element 8 and an output-side housing element 9.

The output-side housing element 9 has a stepped cylindrical inner peripheral surface. The inner peripheral surface of the output-side housing element 9 has a small-diameter cylindrical surface portion 10 on the other side in the axial direction, a large-diameter cylindrical surface portion 11 on the one side in the axial direction, and a connecting surface portion 12 that connects the small-diameter cylindrical surface portion 10 and the large-diameter cylindrical surface portion 11 and faces the one side in the axial direction. In this example, the pressed surface 7 is configured by the large-diameter cylindrical surface portion 11.

The output-side housing element 9 has an inward flange portion 13 protruding toward inside in the radial direction at an end portion on the other side in the axial direction of the small-diameter cylindrical surface portion 10, and has a cylindrical inner diameter side fitting surface portion 14 on an outer peripheral surface of an end portion on the one side in the axial direction thereof.

The input-side housing element 8 includes a hollow circular plate-shaped side plate portion 15, a large-diameter cylindrical portion 16 bent o over the entire circumference from an end portion on the outside in the radial direction of the side plate portion 15 toward the other side in the axial direction, and a small-diameter cylindrical portion 17 protruding from an intermediate portion in the radial direction of the side plate portion 15 toward the one side in the axial direction over the entire circumference. The large-diameter cylindrical portion 16 has an outer diameter side fitting surface portion 18 on an inner peripheral surface thereof.

In this example, by fitting the inner diameter side fitting surface portion 14 of the output-side housing element 9 and the outer diameter side fitting surface portion 18 of the input-side housing element 8 by spigot fitting without looseness, the input-side housing element 8 and the output-side housing element 9 are positioned in the radial direction. With the input-side housing element 8 and the output-side housing element 9 thus positioned in the radial direction, the input-side housing element 8 and the output-side housing element 9 are connected to each other by a connecting member such as a bolt (not illustrated) so as to configure the pressed member 2. The pressed member 2 is supported and fixed to the fixed portion by screwing bolts inserted through holes provided in the fixed portion into screw holes 19 opening on a surface on the other side in the axial direction of the output-side housing element 9.

The input member 3 is connected to an input-side mechanism such as an electric motor, and receives rotational toque. The input member 3 has an input shaft portion 20, an input flange portion 21, and an input-side engaging portion 22.

In this example, the input shaft portion 20 has a cylindrical shape.

The input flange portion 21 protrudes toward outside in the radial direction over the entire circumference from the outer peripheral surface of an end portion on the other side in the axial direction of the input shaft portion 20.

In this example, the input-side engaging portions 22 protrude toward the other side in the axial direction from two locations of a surface on the other side in the axial direction of the input flange portion 21 that are positioned on opposite sides in the radial direction. The number of the input-side engaging portion 22 corresponds to the number of the engaging element 5. In this example, a pair of (two) input-side engaging portions 22 are provided, and the input-side engaging portions 22 are separated from each other in the radial direction of the input member 3. The pair of input-side engaging portions 22 are arranged in portions of the surface on the other side in the axial direction of the input flange portion 21 that are deviated from the rotation center O of the input member 3 toward outside in the radial direction.

Each of the pair of input-side engaging portions 22 has an end surface shape that is substantially fan-shaped when viewed in the axial direction and that is symmetrical in the circumferential direction. Specifically, inner side surfaces 23 in the radial direction of the pair of input-side engaging portions 22 are configured by flat surfaces parallel to each other, and an outer side surface in the radial direction 24 of each of the input-side engaging portions 22 has the same cylindrical contour shape as the outer peripheral surface of the input flange portion 21. Further, a pair of side surfaces 25 in the circumferential direction of each of the input-side engaging portions 22 are configured by flat surfaces that are inclined in directions away from each other as going toward outside in the radial direction.

The input member 3 is rotatably supported inside the input-side housing element 8 of the pressed member 2 by an input-side radial rolling bearing 26. An outer ring 27 of the input-side radial rolling bearing 26 is fitted inside the small-diameter cylindrical portion 17 of the input-side housing element 8 without looseness, and is held in the axial direction between a portion on the inside in the radial direction of a side surface on the one side in the axial direction of the side plate portion 15 and a retaining ring 30a that is locked in a portion on the one side in the axial direction of the small-diameter cylindrical portion 17. An inner ring 28 of the input-side radial rolling bearing 26 is fitted around an end portion on the other side in the axial direction of the input shaft portion 20 of the input member 3 without looseness, and is held in the axial direction between a side surface on the one side in the axial direction of the input flange portion 21 and a retaining ring 30b that is locked on an outer peripheral surface of an intermediate portion in the axial direction of the input shaft portion 20.

In this example, the input-side radial rolling bearing 26 is configured by a ball bearing using balls as rolling elements 29. However, the input-side radial rolling bearing for supporting the input member 3 may be configured by a tapered roller bearing using tapered rollers or a roller bearing using cylindrical rollers as rolling elements.

The pair of input-side engaging portions 22 is arranged on the inside in the radial direction of the pressed surface 7 in a state where the input member 3 is rotatably supported inside the pressed member 2.

The output member 4 is connected to an output-side mechanism such as a speed-reducing mechanism and outputs rotational torque. The output member 4 is coaxially arranged with the input member 3. In this example, the output member 4 has an output shaft portion 31, an output flange portion 32, an output-side engaging portion 33, and a small diameter shaft portion 34.

The output shaft portion 31 has a columnar shape.

The output flange portion 32 protrudes toward outside in the radial direction over the entire circumference from an outer peripheral surface of an end portion on the one side in the axial direction of the output shaft portion 31.

The output-side engaging portion 33 protrudes toward the one side in the axial direction from the central portion of a side surface on the one side in the axial direction of the output flange portion 32. The output-side engaging portion 33 has a cam function. That is, the distance from the rotation center O of the output member 4 to the outer peripheral surface of the output-side engaging portion 33 is not constant in the circumferential direction.

The output-side engaging portion 33 has a substantially rectangular end surface shape when viewed from the axial direction. That is, the outer peripheral surface of the output-side engaging portion 33 is configured by a pair of long side portions 38 and a pair of short side portions 39. The output-side engaging portion 33 is symmetrical with respect to a virtual plane which passes through the rotation center O of the output member 4 and is perpendicular to the pair of long side portions 38, and is symmetrical with respect to a virtual plane which passes through the rotation center O of the output member 4 and is parallel to the pair of long side portions 38. The pair of short side portions 39 exists on the same cylindrical surface as the outer peripheral surface of the output flange portion 32.

The small diameter shaft portion 34 has a columnar shape and protrudes from the central portion of a side surface on the one side in the axial direction of the output flange portion 32 toward the one side in the axial direction. The axial length of the small diameter shaft portion 34 is larger than the axial length of the output-side engaging portion 33. That is, a tip end portion (end portion on the one side in the axial direction) of the small diameter shaft portion 34 protrudes toward the one side in the axial direction from a tip end surface (end surface on the one side in the axial direction) of the output-side engaging portion 33. Further, the outer-diameter dimension of the small diameter shaft portion 34 is larger than the distance between the pair of long side portions 38 of the output-side engaging portion 33. That is, an outside portion in the radial direction of the small diameter shaft portion 34 protrudes from an intermediate portion in the lengthwise direction of the long side portions 38 toward outside in the radial direction.

The output shaft portion 31 of the output member 4 is rotatably supported inside the output-side housing element 9 by the output-side radial rolling bearing 40. The outer ring 41 of the output-side radial rolling bearing 40 is fitted inside the small-diameter cylindrical surface portion 10 of the output-side housing element 9 without looseness, and is axially held between a side surface on the one side in the axial direction of the inward flange portion 13 and a retaining ring 44a locked at an end portion on the one side in the axial direction of the small-diameter cylindrical surface portion 10. An inner ring 42 of the output-side radial rolling bearing 40 is fitted around the output shaft portion 31 without looseness, and is axially held between a side surface on the other side in the axial direction of the output flange portion 32 and a retaining ring 44b locked on an outer peripheral surface of an intermediate portion in the axial direction of the output shaft portion 31.

In this example, the output-side radial rolling bearing 40 is configured by a ball bearing using balls as rolling elements 43. However, the radial rolling bearing for supporting the output member 4 may be configured by a tapered roller bearing using tapered rollers or a roller bearing using cylindrical rollers as rolling elements.

The small diameter shaft portion 34 of the output member 4 is inserted inside the input member 3. It is also possible to arrange a radial bearing such as a sliding bearing between an outer peripheral surface of the small diameter shaft portion 34 and an inner peripheral surface of the input member 3. A locking groove 59 is formed over the entire circumference of the outer peripheral surface of an intermediate portion in the axial direction of the small diameter shaft portion 34.

In a state where the output member 4 is rotatably supported inside the pressed member 2, the output-side engaging portion 33 is arranged between the pair of input-side engaging portions 22.

The engaging element 5 has a pressing surface 45 facing the pressed surface 7, an input-side engaged portion 50 that can be engaged with the input-side engaging portion 22, and an output-side engaged portion that can be engaged with the output-side engaging portion 33, and is arranged between the pressed surface 7 and the output-side engaging portion 33 with regard to a first direction, which is a direction of moving toward or away from the pressed surface 7, so as to move in the first direction.

In this example, a pair of (two) engaging elements 5 are provided. The pair of engaging elements 5 is arranged on the inside in the radial direction of the pressed member 2 so as to move in the first direction in a state where the respective pressing surfaces 45 are directed to opposite sides in the radial direction and the respective inner side surfaces in the radial direction face each other. In a case of implementing the reverse-input blocking clutch of the present disclosure, the number of engaging element is arbitrary, and the number of engaging element can be one or three or more. In this case, the configuration of the input-side engaging portion and the output-side engaging portion can be appropriately changed according to the number of engaging element.

Figure 2:
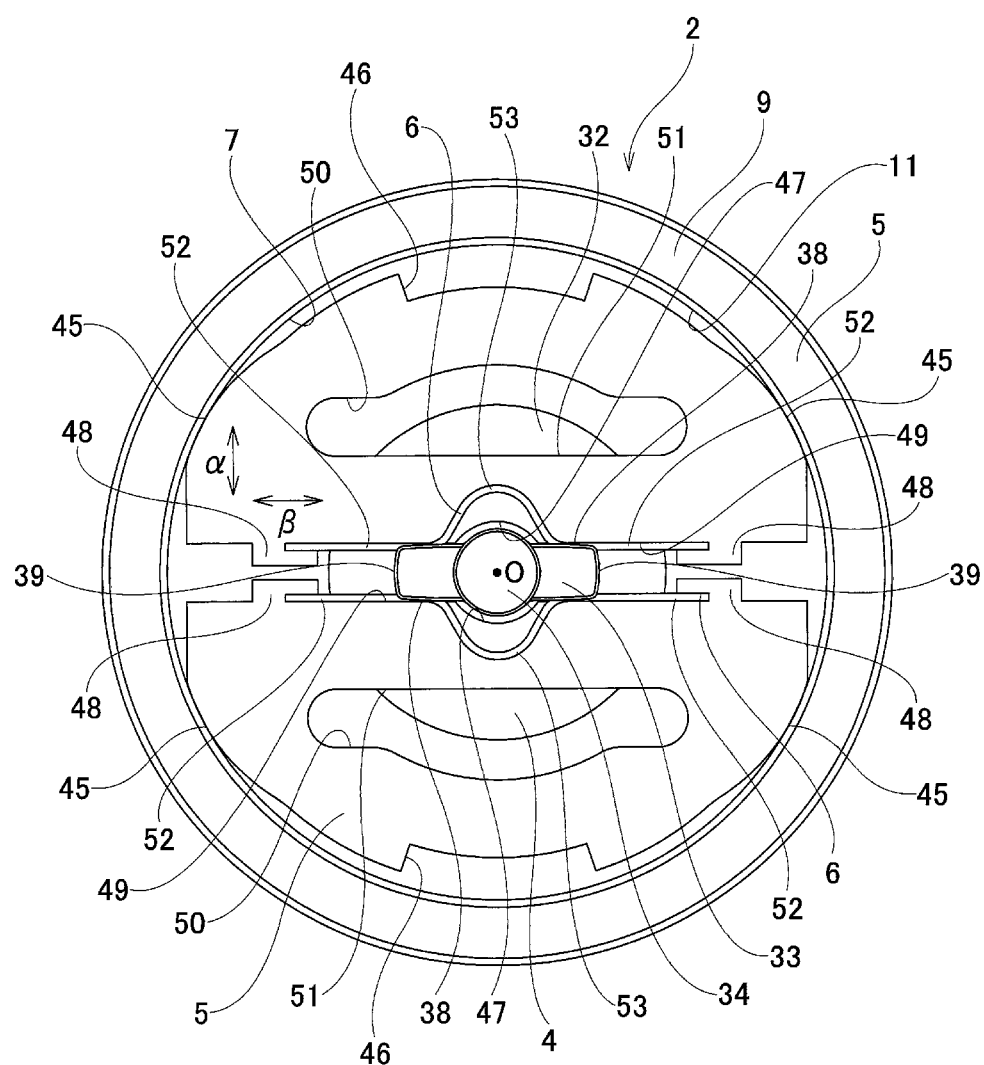
FIG. 2 is a cross-sectional view of the reverse-input blocking clutch taken along A-A of FIG. 1 with an input member and an input-side housing member omitted.

In the description of the engaging element 5, the radial direction of the engaging element 5 is the direction indicated by the arrow a in FIG. 2, which is the direction of movement of the engaging elements 5 moving toward or away from the pressed surface 7, that means the first direction. Further, the width direction of the engaging element 5 is a direction indicated by the arrow B in FIG. 2, that means a direction perpendicular to the first direction.

Each engaging element 5 configuring the pair of engaging elements 5 has a pair of pressing surfaces 45 facing the pressed surface 7 at two locations separated in the circumferential direction of the outer side surface in the radial direction, and has a substantially arcuate notch 46 at the central portion in the circumferential direction located between the pair of pressing surfaces 45 on the outer side surface in the radial direction. Each pressing surface 45 is configured by a partially cylindrical convex curved surface having a radius of curvature smaller than the radius of curvature of the pressed surface 7.

When viewed from the axial direction, of the outer side surface in the radial direction of the engaging element 5, portions deviated in the circumferential direction from the pair of pressing surfaces 45 including the notch 46 exist on the inside in the radial direction of a virtual circle centered on the center axis O of the input member 3 and in contact with the pair of pressing surfaces 45. That is, in a state where the pair of pressing surfaces 45 is in contact with the pressed surface 7, the portions of the outer side surface in the radial direction of the engaging element 5 that are deviated from the pair of pressing surfaces 45 in the circumferential direction do not come in contact with the pressed surface 7.

It is preferable that each pressing surface 45 has a surface texture that has a larger coefficient of friction with respect to the pressed surface 7 than surfaces of other portions of the engaging element 5. Further, the pressing surfaces 45 can be configured so as to be integral with the engaging elements 5, or can be configured by surfaces made of friction materials fixed to, for example, the outer side surfaces in the radial direction of the engaging elements 5 by sticking, bonding, or the like.

Each of the engaging elements 5 includes a concave portion 47 having an arcuate cross-sectional shape at the central portion in the width direction of an end portion on the inside in the radial direction, and includes a pair of convex portions 48 protruding toward inside in the radial direction on both side portions of the concave portion 47 in the width direction. Further, the engaging element 5 includes a flat surface portion 49 extending in the width direction of the engaging element 5 when viewed from the axial direction, on the portion other than the concave portion 47 and the pair of convex portions 48 formed on the inner side surface in the radial direction thereof. The flat surface portions 49 of the pair of engaging elements 5 are configured by flat surfaces parallel to each other.

Figure 3:
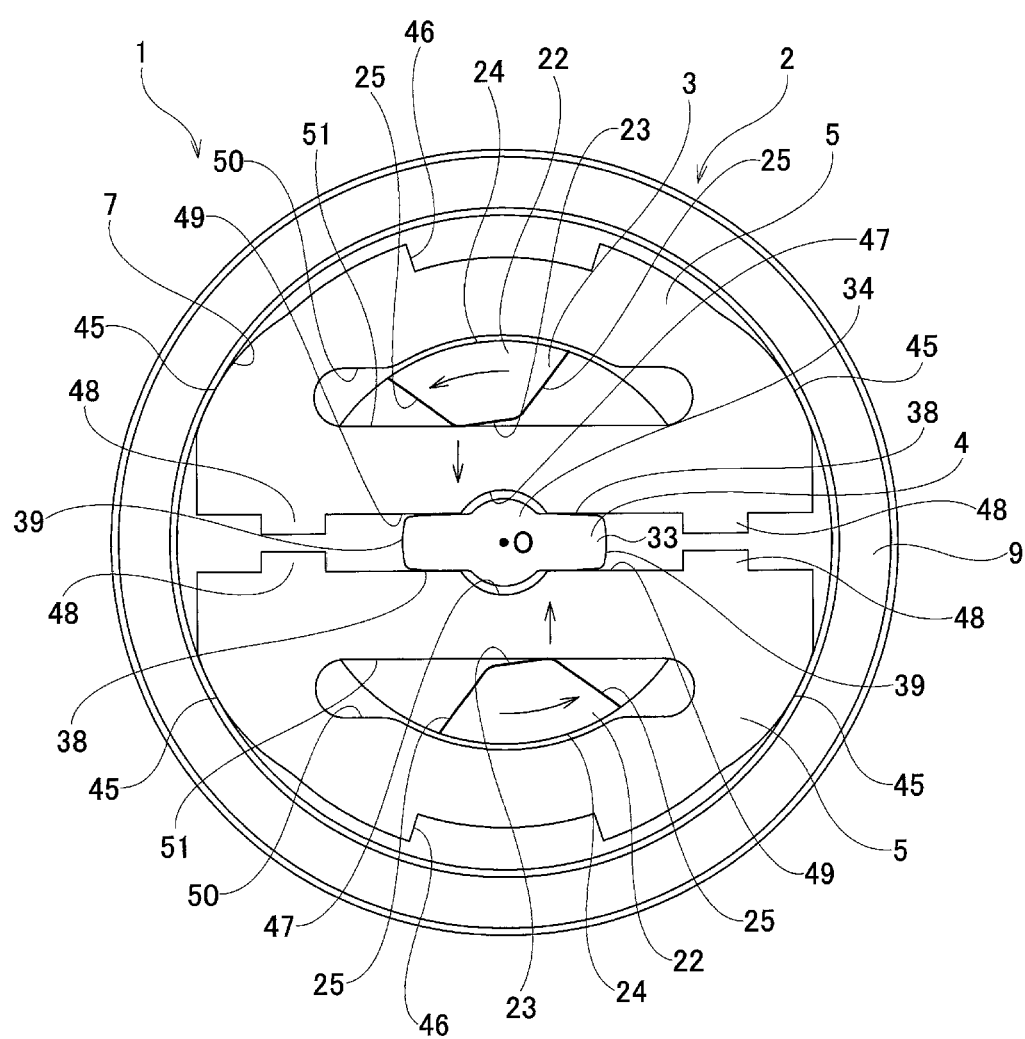
FIG. 3 is a cross-sectional view taken along B-B of FIG. 1 illustrating a state in which rotational torque is input to the input member.

The inner surface of the concave portion 47 is configured by a cylindrical concave surface having a radius of curvature larger than the radius of curvature of the outer peripheral surface of the small diameter shaft portion 34 of the output member 4. As illustrated in FIG. 3, when rotational torque is input to the input member 3, portions of the flat surface portion 49 located on both sides of the concave portion 47 in the width direction engage with the output-side engaging portion 33. That is, in this example, the output-side engaged portion is configured by the portions of the flat surface portion 49 located on both sides of the concave portion 47 in the width direction.

The engaging element 5 has an input-side engaged portion 50, which can be engaged with an input-side engaging portion 22, at an intermediate portion in the radial direction of a central portion in the width direction. In this example, the input-side engaged portion 50 has a substantially arcuate opening shape when viewed from the axial direction, and is configured by a through hole axially penetrating through the intermediate portion in the radial direction of the engaging element 5 at the central location in the width direction. The input-side engaged portion 50 has a size that allows the input-side engaging portion 22 to be loosely inserted. Due to this, in a state where the input-side engaging portion 22 is inserted inside the input-side engaged portion 50, gaps exist between the input-side engaging portion 22 and the inner surface of the input-side engaged portion 50 in the width direction and the radial direction of the engaging element 5, respectively. As a result, the input-side engaging portion 22 can be displaced in the rotational direction of the input member 3 with respect to the input-side engaged portion 50 of the engaging element 5, and the input-side engaged portion 50 can be displaced in the radial direction of the engaging element 5 with respect to the input-side engaging portion 22. In this example, the input-side engaged portion 50 has a flat surface 51 parallel to the flat surface portion 49 on the inner side surface in the radial direction thereof (surface facing toward outside in the radial direction).

In a case of implementing the present disclosure, the input-side engaged portion can also be configured by a bottomed hole that opens only on a side surface on the one side in the axial direction of the engaging element. Alternatively, the input-side engaged portion can also be configured by a notch that opens on an outer side surface in the radial direction of the engaging element.

In a state where the pair of engaging elements 5 is arranged inside in the radial direction of the pressed member 2, the pair of input-side engaging portions 22 of the input member 3 is arranged inside the input-side engaged portions 50 of the pair of engaging elements 5, and the output-side engaging portion 33 of the output member 4 is arranged between the pair of flat surface portions 49.

The inner diameter dimension of the pressed member 2 and the radial dimension of the engaging element 5 are regulated so that a gap exists at least one of portions between the pressed surface 7 and the pair of pressing surfaces 45 and between the tip end surfaces of the convex portions 48 of the pair of engaging elements 5 in a state where the pair of engaging elements 5 is arranged inside in the radial direction of the pressed member 2.

In order to suppress looseness between the output-side engaging portion 33 of the output member 4 and the flat surface portions 49 configuring the output-side engaged portion of the engaging element 5, the elastic member 6 elastically urges the engaging element 5 in a direction to bring the pair of pressing surfaces 45 closer to the pressed surface 7 with regard to the first direction.

In this example, an elastic member 6 is arranged in each engaging element 5 of the pair of engaging elements 5. Specifically, the elastic member 6 is arranged between the output-side engaging portion 33 of the output member 4 and the flat surface portion 49 of the engaging element 5. The number of the elastic member 6 can be changed according to the number of the engaging element 5. That is, the pair of engaging elements 5, a pair of (two) elastic members 6, and the output-side engaging portion 33 are arranged such that the flat surface portions 49 and the pair of elastic members 6 hold the output-side engaging portion 33 from the outside in the radial direction.

Figure 6:
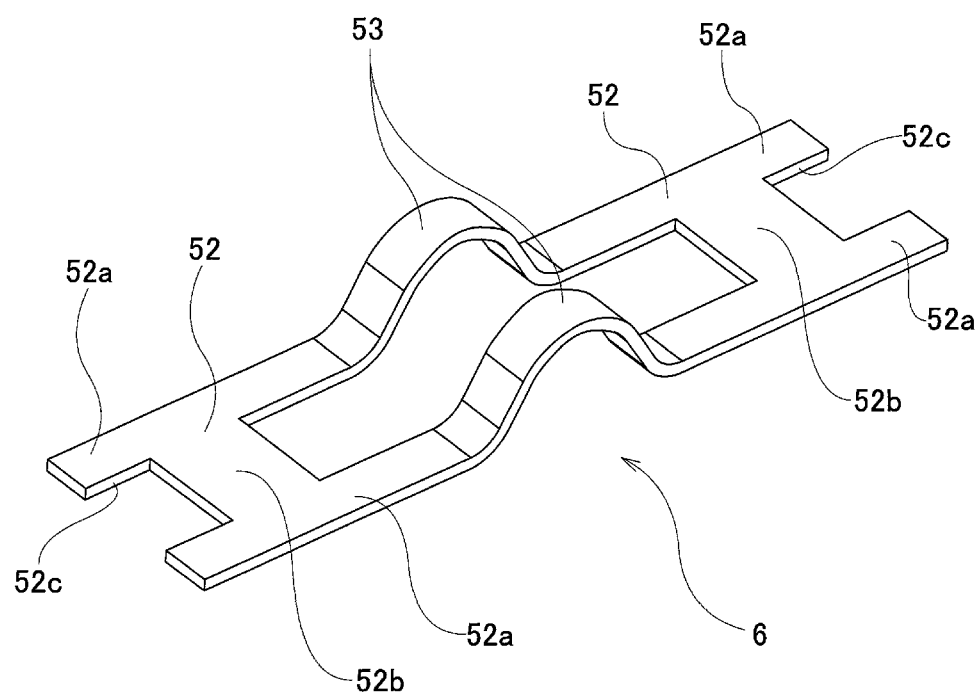
FIG. 6 is a perspective view of an elastic member taken out from the reverse-input blocking clutch.

In this example, the elastic member 6 is configured by a leaf spring. In a case of implementing the reverse-input blocking clutch of the present disclosure, the elastic member 6 can be configured by a coil spring, disc spring, or elastic material such as rubber, elastomer, or resin. As illustrated in FIG. 6, the elastic member 6 has a pair of arm portions 52 and a pair of connecting portions 53.

The pair of arm portions 52 has a substantially H-shaped planar shape when viewed from the plate thickness direction (radial direction of the engaging elements 5). Specifically, each arm portion 52 has a pair of width direction plate pieces 52a having a rectangular shape respectively, separated from each other in the axial direction, and extending in the width direction of the engaging elements 5, and an axial direction plate piece 52b connecting the intermediate portions in the extending direction of the pair of width direction plate piece 52a. That is, each arm portion 52 has a notch 52c that opens at a tip end portion (an end portion on the outside in the width direction of the engaging elements 5).

Of the pair of connecting portions 53, a connecting portion 53 on the one side in the axial direction connects base end portions of the width direction plate pieces 52a on the one side in the axial direction of the pair of arm portions 52 (end portions thereof on the inside in the width direction of the engaging elements 5), and a connecting portion 53 on the other side in the axial direction connects base end portions of the width direction plate pieces 52a on the other side in the axial direction of the pair of arm portions 52. In this example, each connecting portion 53 has a substantially U-shaped or substantially V-shaped end surface shape when viewed from the axial direction. However, in a case of implementing the present disclosure, the shape of the connecting portion is not particularly limited as long as it can prevent interference with the input member and the output member. For example, the connecting portion can be configured in a flat plate shape.

The pair of elastic members 6 engage the notches 52c formed in the pair of arm portions 52 with the pair of convex portions 48 of the respective engaging elements 5. In other words, the pair of convex portions 48 of the engaging element 5 is arranged inside the notches 52c of the pair of arm portions 52 of the elastic member 6. As a result, the elastic member 6 is supported so as not to displace in the axial and width directions, but so as to displace in the radial direction (first direction) with respect to the engaging element 5. In this example, regardless of the positional relationship between each engaging element 5 and the output-side engaging portion 33, specifically, regardless of the position in the radial direction of each engaging element 5 and the rotational phase of the output-side engaging portion 33 with respect to each engaging element 5, the output-side engaging portion 33 is configured to elastically abut against the pair of elastic members 6. As a result, looseness between the output-side engaging portion 33 and the output-side engaged portion is suppressed. Portions on both sides in the axial direction of the pair of arm portions 52 of each elastic member 6 protrude in the axial direction beyond both side surfaces in the axial direction of the engaging element 5.

The reverse-input blocking clutch 1 of this example includes a pair of spacers 54. Each spacer 54 of the pair of spacers 54 has a flat plate shape, has a substantially elliptical or substantially rectangular end surface shape when viewed from the axial direction, and has a through hole 55 through which the output-side engaging portion 33 and the small diameter shaft portion 34 can be inserted without looseness. The pair of spacers 54 is arranged on both sides in the axial direction of the pair of elastic members 6 in a state where the output-side engaging portion 33 and the small diameter shaft portion 34 are inserted into the through holes 55 without looseness.

The pair of spacers 54 prevents end surfaces of the pair of elastic members on both sides in the axial direction configured by fractured surfaces and sheared surfaces from coming into contact with a side surface on the other side in the axial direction of the input flange portion 21 of the input member 3 and a side surface on the one side in the axial direction of the output flange portion 32 of the output member 4. Further, looseness of the engaging elements 5 is suppressed by holding the pair of elastic members 6 in the axial direction with the pair of spacers 54 and by extending the spacers 54 to positions facing the pair of arm portions 52 of the elastic members 6 and thus restricting looseness of the pair of arm portions 52 in the axial direction.

In this example, axial displacement of the engaging elements 5 is regulated since the pair of spacers 54 faces the pair of arm portions 52 of the elastic members 6. However, it is also possible to regulate the axial displacement of the engaging elements by bringing the pair of spacers directly face the engaging elements.

Figure 9:
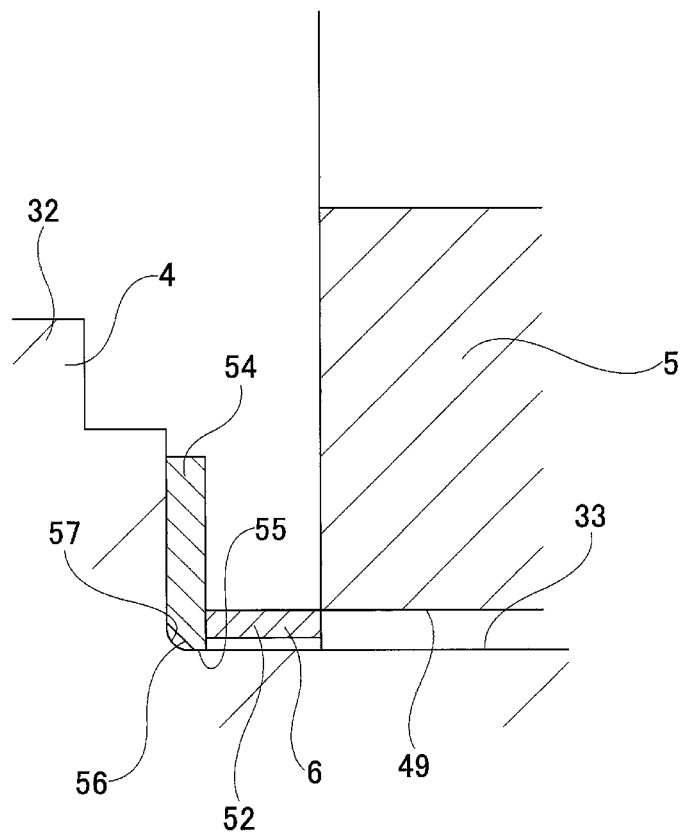
FIG. 9 is an enlarged cross-sectional view of major parts of the reverse-input blocking clutch for explaining why it is preferable to provide a chamfer section on a spacer on the side of the output member.
Figure 10:
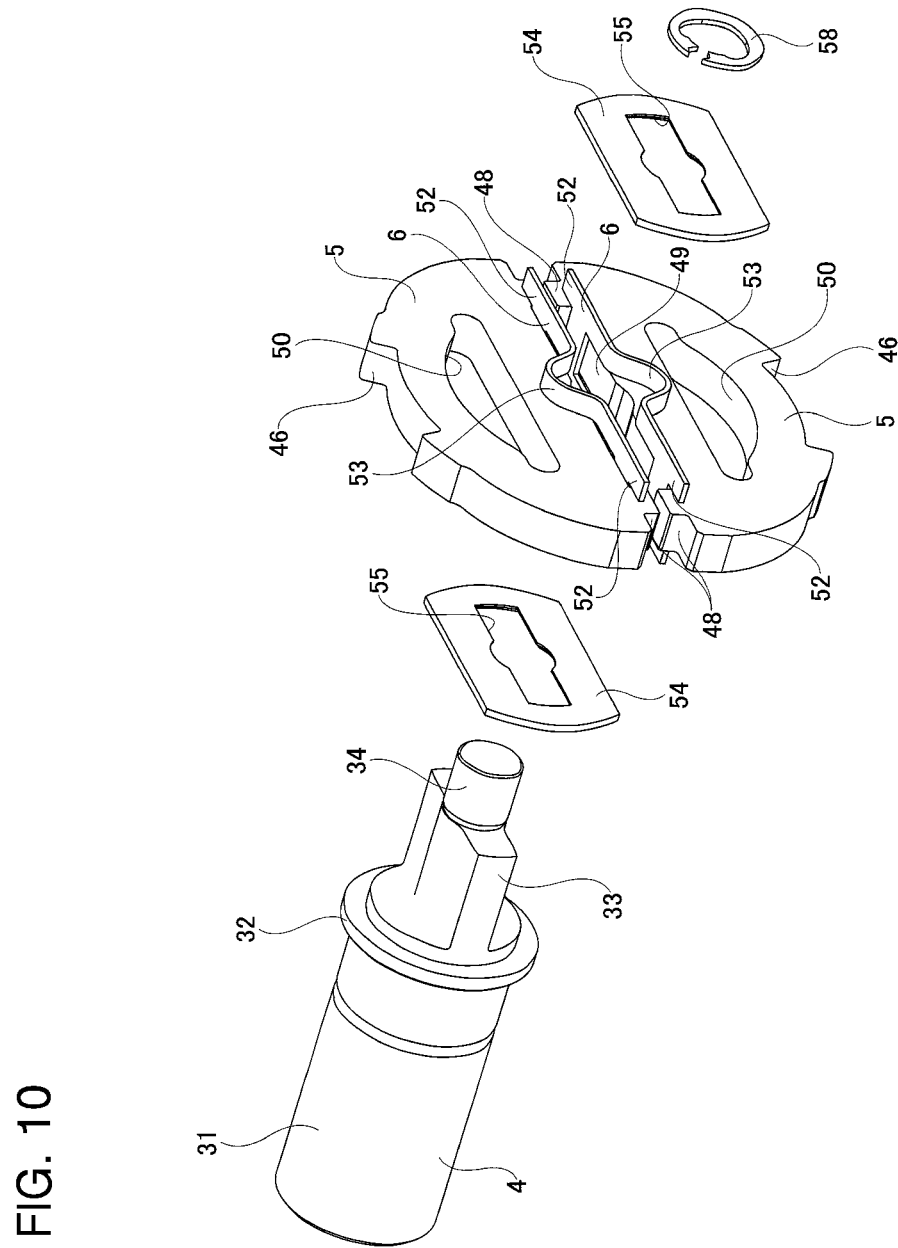
FIG. 10 is an exploded perspective view illustrating the preliminary assembly.

As illustrated in FIG. 9, of the pair of spacers 54, at least a spacer 54 on the other side in the axial direction preferably has a chamfer section 56 on an opening edge on the other side in the axial direction of the through hole 55. The chamfer section 56 is configured in a C-chamfered shape having a linear cross-sectional shape. Further, the chamfering depth of the chamfer section 56 is set to be equal to or larger than the chamfering radius of the corner R portion 57 that connects the side surface on the one side in the axial direction of the output flange portion 32 and the long side portion 38 of the output-side engaging portion 33. The presence of the chamfer section 56 effectively prevents interference between the corner R portion 57 and the opening edge on the other side in the axial direction of the through hole 55 provided in the spacer 54 on the other side in the axial direction.

The reverse-input blocking clutch 1 of this example includes a stopper member 58. The stopper member 58 is configured by a retaining ring having a partial cylindrical shape. That is, the stopper member 58 has a substantially C-shaped end surface shape when viewed from the axial direction. However, in a case of implementing the present disclosure, the stopper member can also be configured by a speed nut or a bush nut that has a hollow circular plate shape and has radial slits formed on an inside portion in the radial direction thereof.

The stopper member 58 is locked in a locking groove 59 provided on the outer peripheral surface of the intermediate portion in the axial direction of the small diameter shaft portion 34, and faces the side surfaces on the one side in the axial direction of the pair of engaging elements 5 through a spacer 54 on the one side in the axial direction and the pair of elastic members 6. In other words, the pair of elastic members 6 supported by the pair of engaging elements 5 so as not to relatively displace in the axial and width directions is held between the side surface on the one side in the axial direction of the output flange portion 32 and the stopper member 58 through the pair of spacers 54. As a result, the pair of engaging elements 5 is prevented from displacing in the axial direction relative to the output member 4. That is, the stopper member 58 configures a displacement prevention means.

However, in a case of implementing the reverse-input blocking clutch of the present disclosure, alternatively or additionally, the spacer can be locked to the output member and face the side surface in the axial direction of the engaging element directly or through the other member such as an elastic member. That is, the spacer can also be provided with a function as a stopper member.

Further, in this example, the stopper member 58 faces the side surface of the engaging element 5 on the one side in the axial direction through a spacer 54 and the elastic member 6. However, the spacer 54 can be omitted or can directly face the side surface of the engaging element 5 on the one side in the axial direction. Alternatively, a displacement prevention means for preventing displacement of the engaging element in the axial direction relative to the output member can also be configured by, for example, a crimpled portion formed on the output member.

<Explanation of Operation of Reverse-Input Blocking Clutch>

Figure 4:
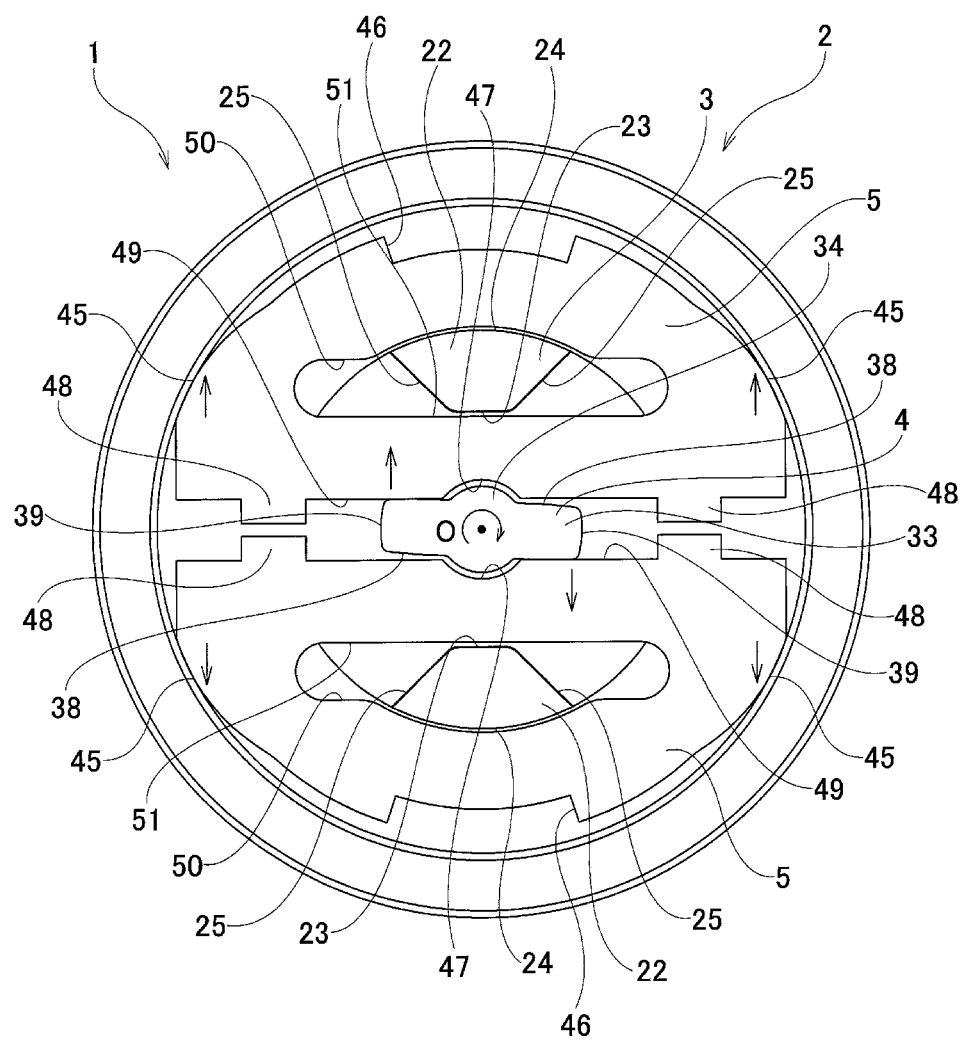
FIG. 4 is a cross-sectional view taken along B-B of FIG. 1 illustrating a state in which rotational torque is reversely input to the output member.
Figure 5:
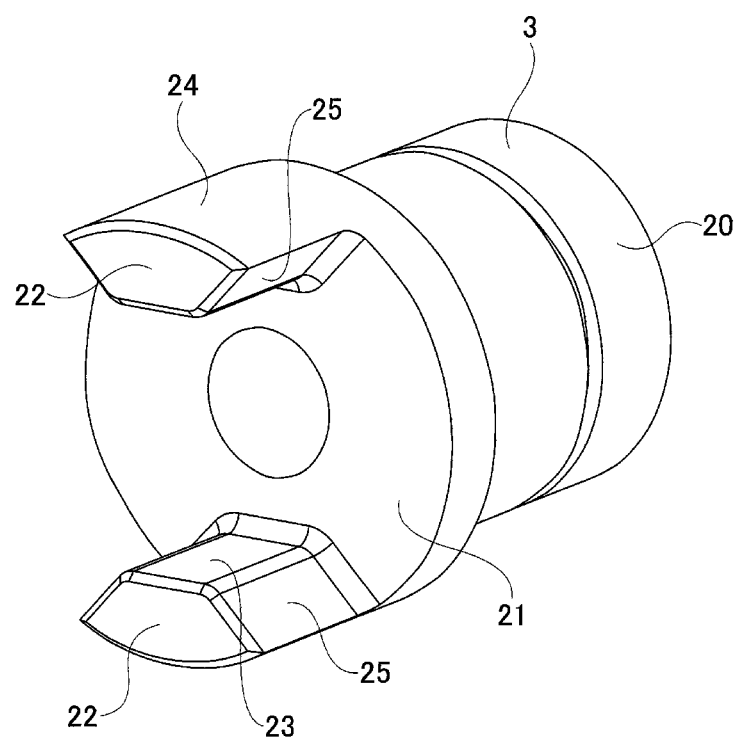
FIG. 5 is a perspective view of the input member.

The operation of the reverse-input blocking clutch 1 of this example will be descried with reference to FIG. 3 and FIG. 4. Note that in FIG. 3 and FIG. 4, gaps between the input member 3 and the output member 4 and the pair of engaging elements 5 are exaggerated.

First, a case where rotational torque is input to the input member 3 from the input-side mechanism will be described.

When rotational torque is input to the input member 3, as illustrated in FIG. 3, the input-side engaging portion 22 rotates in the rotational direction of the input member 3 (counterclockwise direction in the example illustrated in FIG. 4) inside the input-side engaged portion 50. Then, the inner side surface 23 in the radial direction of the input-side engaging portion 22 presses the flat surface 51 of the input-side engaged portion 50 toward inside in the radial direction, thereby moving the engaging element 5 in a direction away from the pressed surface 7. That is, the engaging element 5 is moved toward inside in the radial direction based on engagement with the input member 3. In this example, due to the engagement between the pair of input-side engaging portions 22 and the pair of engaging elements 5, the engaging element 5 located on the upper side in FIG. 3 is moved toward the lower side and the engaging element 5 located on the lower side in FIG. 3 is moved toward the upper side.

As a result, the engaging element 5 moves inward in the radial direction, and the flat surface portion 49 of the output-side engaged portion of the engaging element 5 engages with the output-side engaging portion 33 of the output member 4. In this example, the inner side surfaces in the radial direction of the pair of engaging elements 5 move in a direction toward each other, and the flat surface portions 49 of the pair of engaging elements 5 hold the output-side engaging portion 33 of the output member 4 from both sides in the radial direction. Specifically, when the flat surface portion 49 of the engaging element 5 and the output-side engaging portion 33 engage, the output member 4 rotates so that the long side portion 38 of the output-side engaging portion 33 are parallel to the flat surface portion 49 of the engaging element 5, and the output-side engaging portion 33 and the flat surface portion 49 are brought into contact without looseness. As a result, rotational torque input to the input member 3 is transmitted to the output member 4 through the engaging element 5 and output from the output member 4.

In the reverse-input blocking clutch 1 of this example, when rotational torque is input to the input member 3, the engaging element 5 moves in the direction away from the pressed surface 7 regardless of the rotational direction of the input member 3. Then, the rotational torque input to the input member 3 is transmitted to the output member 4 through the engaging element 5.

Next, a case where rotational torque is reversely input to the output member 4 from an output-side mechanism will be described.

When rotational torque is reversely input to the output member 4, as illustrated in FIG. 4, the output-side engaging portion 33 rotates in the rotational direction of the output member 4 (clockwise direction in the example illustrated in FIG. 4). Then, of the outer peripheral surface of the output-side engaging portion 33, a connecting portion (corner portion) between the long side portion 38 and the short side portion 39 presses the flat surface portion 49 of the output-side engaged portion of the engaging element 5 toward outside in the radial direction, and the engaging element 5 moves in the direction closer to the pressed surface 7, that is, toward outside in the radial direction. As a result, the pressing surface 45 of the engaging element 5 is frictionally engaged with the pressed surface 7. In this example, by engaging the output-side engaging portion 33 of the output member 4 and the flat surface portions 49 of the pair of engaging elements 5, the pair of engaging elements 5 moves in a direction away from each other, that is, the engaging element 5 located on the upper side in FIG. 4 is moved toward the upper side and the engaging element 5 located on the lower side in FIG. 4 is moved toward the lower side respectively such that the pressing surfaces 45 of the pair of engaging elements 5 are frictionally engaged with the pressed surface 7.

As a result, the rotational torque reversely input to the output member 4 is completely blocked and not transmitted to the input member 3, or only a part of the rotational torque reversely input to the output member 4 is transmitted to the input member 3 and the remaining part is blocked. In order to completely block the rotational torque reversely input to the output member 4 and prevent it from being transmitted to the input member 3, the output member 4 is locked by holding the engaging element 5 between the output-side engaging portion 33 and the pressed member 2 so as to prevent the pressing surface 45 of the engaging element 5 from sliding (rotating) with respect to the pressed surface 7. On the other hand, in order to transmit only a part of the rotational torque reversely input to the output member 4 to the input member 3 and block the remaining part, the output member 4 is semi-locked by holding the engaging element 5 between the output-side engaging portion 33 and the pressed member 2 so as to allow the pressing surface 45 to slide with respect to the pressed surface 7.

In the reverse-input blocking clutch 1 of this example, the size of the gaps between each component member is adjusted so as to enable the operation described above. In particular, in the positional relationship in which the pressing surface 45 of the engaging element 5 is in contact with the pressed surface 7, gaps are provided between the inner side surface 23 in the radial direction of the input-side engaging portions 22 and the inner surface of the input-side engaged portion 50 so as to allow the pressing surface 45 to be further pressed against the pressed surface 7 based on pressing the corner portion of the output-side engaging portion 33 presses the flat surface portion 49. As a result, the input-side engaging portion 22 is prevented from blocking the engaging element 5 moving toward outside in the radial direction when rotational torque is reversely input to the output member 4. Further, even after the pressing surface 45 contacts the pressed surface 7, the output member 4 is properly locked or semi-locked by making the surface pressure acting on a contact portion between the pressing surface 45 and the pressed surface 7 change depending on the magnitude of the rotational torque reversely input to the output member 4.

<How to Assemble Reverse-Input Blocking Clutch>

The reverse-input blocking clutch 1 of this example can be assembled, for example, as follows.

Figure 7:
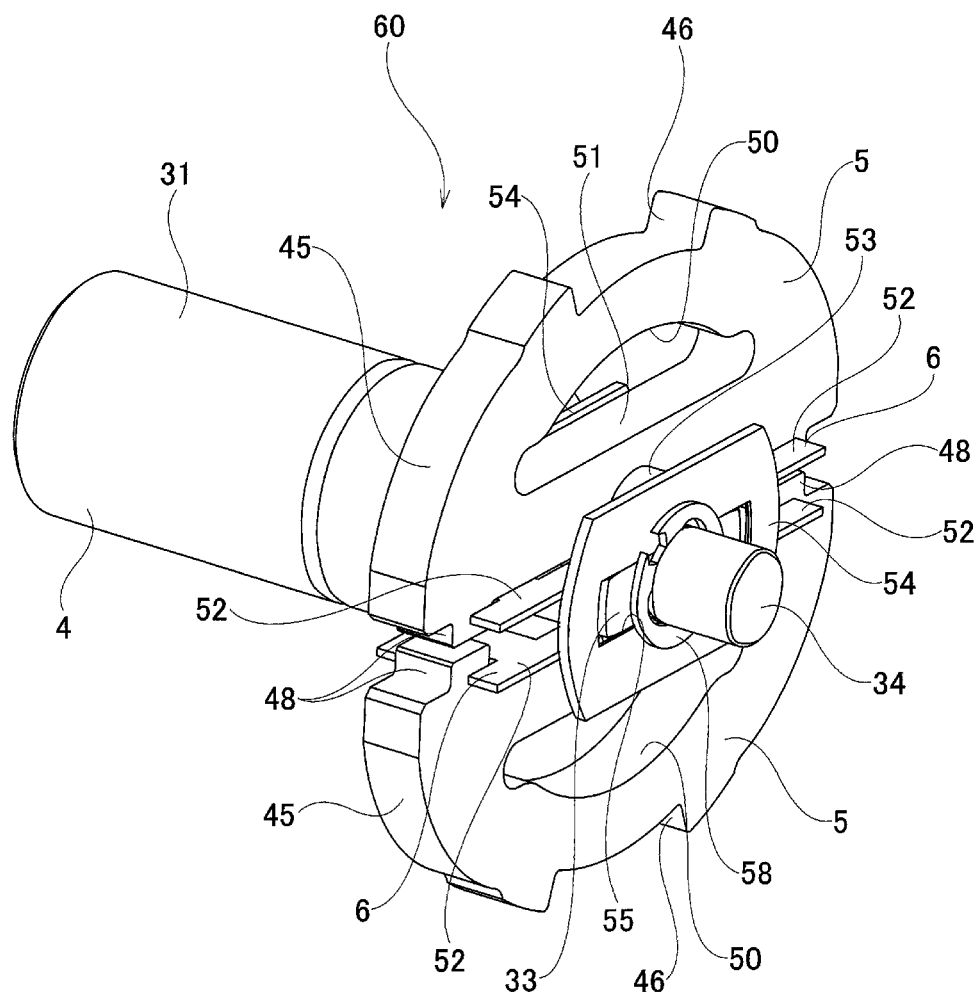
FIG. 7 is a perspective view of a preliminary assembly configured when assembling the reverse-input blocking clutch.
Figure 8:
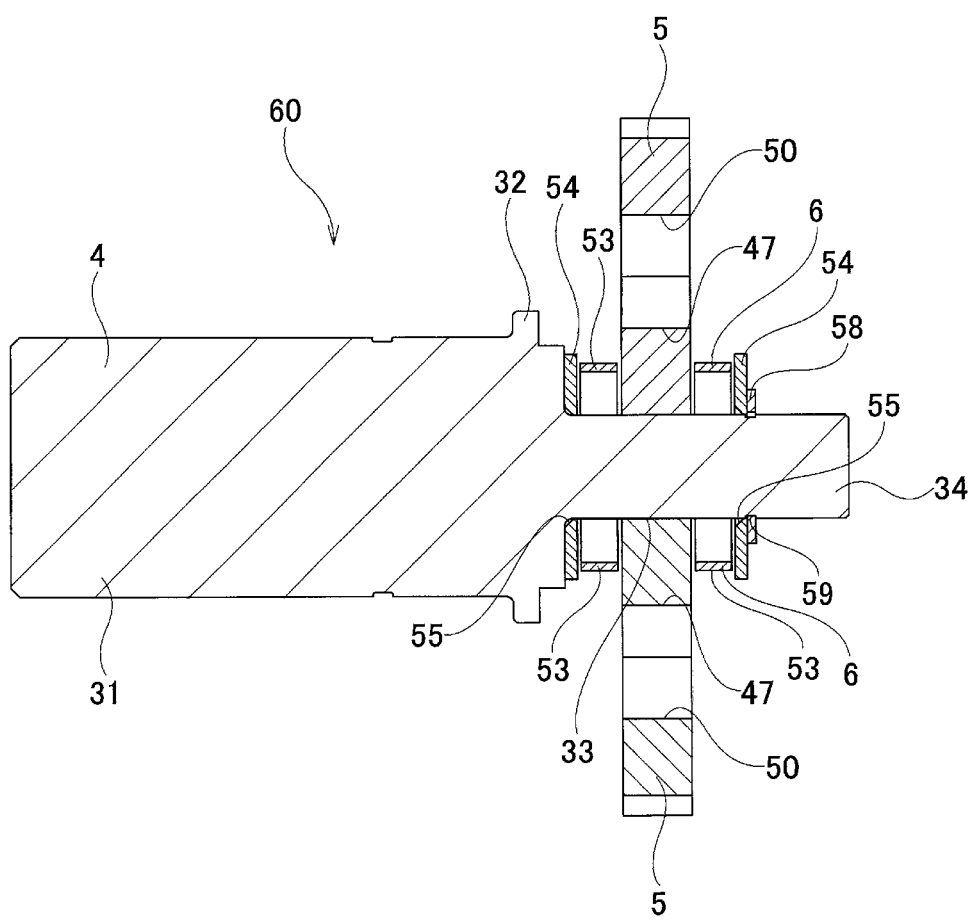
FIG. 8 is a cross-sectional view of the preliminary assembly.

First, the output-side engaging portion 33 of the output member 4 and the small diameter shaft portion 34 are inserted into the through holes 55 of the pair of spacers 54. The elastic member 6 is supported on the engaging element 5 by engaging the notches 52c of the elastic member 6 with the pair of convex portions 48 of the engaging element 5. Next, the pair of engaging elements 5 is arranged so that the flat surface portions 49 and the pair of elastic members 6 hold the output-side engaging portion 33 of the output member 4 from outside in the radial direction. Then, the stopper member 58 is locked in the locking groove 59 of the output member 4. By doing this, a preliminary assembly 60 as illustrated in FIG. 7 and FIG. 8 is obtained.

The inner ring 42 of the output-side radial rolling bearing 40 is fitted around the output shaft portion 31 of the output member 4 without looseness, and the retaining ring 44b is locked on the outer peripheral surface of the intermediate portion in the axial direction of the output shaft portion 31.

Figure 11:
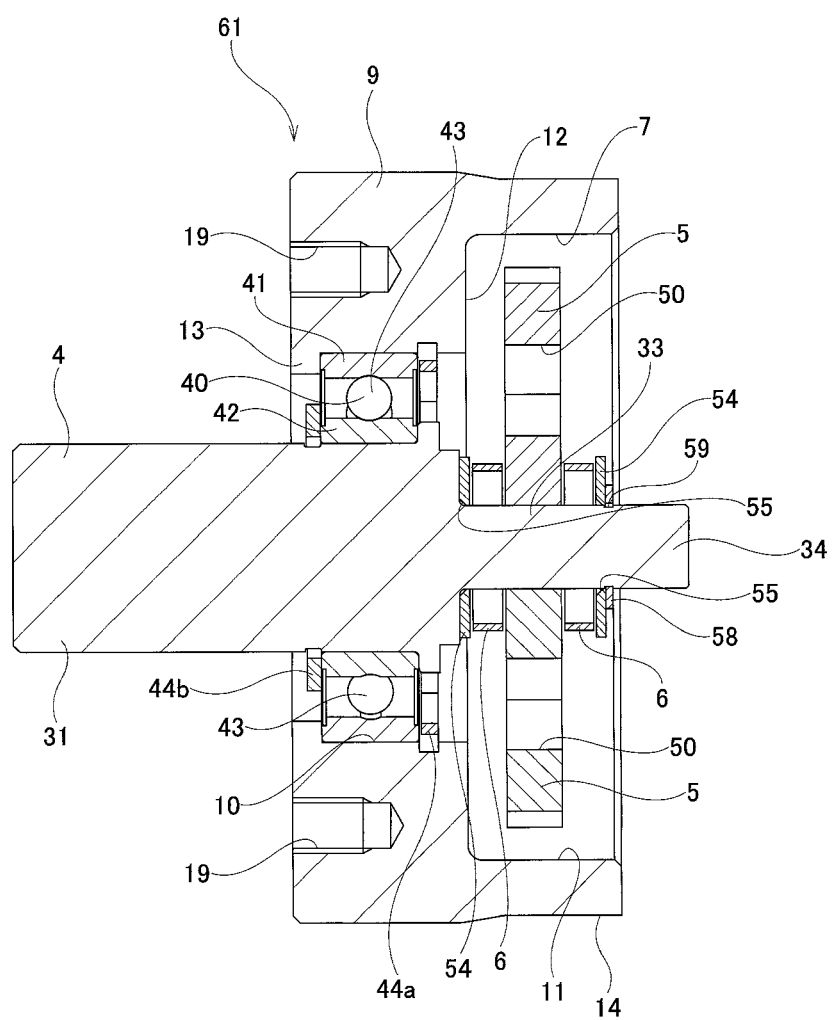
FIG. 11 is a cross-sectional view of an output-side assembly configured when assembling the reverse-input blocking clutch.

The output member 4 is inserted inside the output-side housing element 9 from the one side in the axial direction. When inserting the output member 4 inside the output-side housing element 9, an assembly jig (not illustrated) is used to displace the pair of engaging elements 5 in a direction toward each other (toward inside in the radial direction) against the elasticity of the pair of elastic members 6. After the end surface on the other side in the axial direction of the outer ring 41 of the output-side radial rolling bearing 40 comes into contact with the side surface on the one side in the axial direction of the inward flange portion 13, the assembly jig is retracted, and the pair of engaging elements 5 is displaced in a direction away from each other (toward outside in the radial direction) by the elasticity of the pair of elastic members 6, and the pressing surfaces 45 are brought into contact with the pressed surface 7. Then, a retaining ring 44a is engaged with an end portion on the one side in the axial direction of the small-diameter cylindrical surface portion 10 to obtain an output-side assembly 61 as illustrated in FIG. 11.

The steps for assembling the output-side assembly 61 can be suitably rearranged or performed simultaneously as long as no contradiction occurs.

Figure 12:
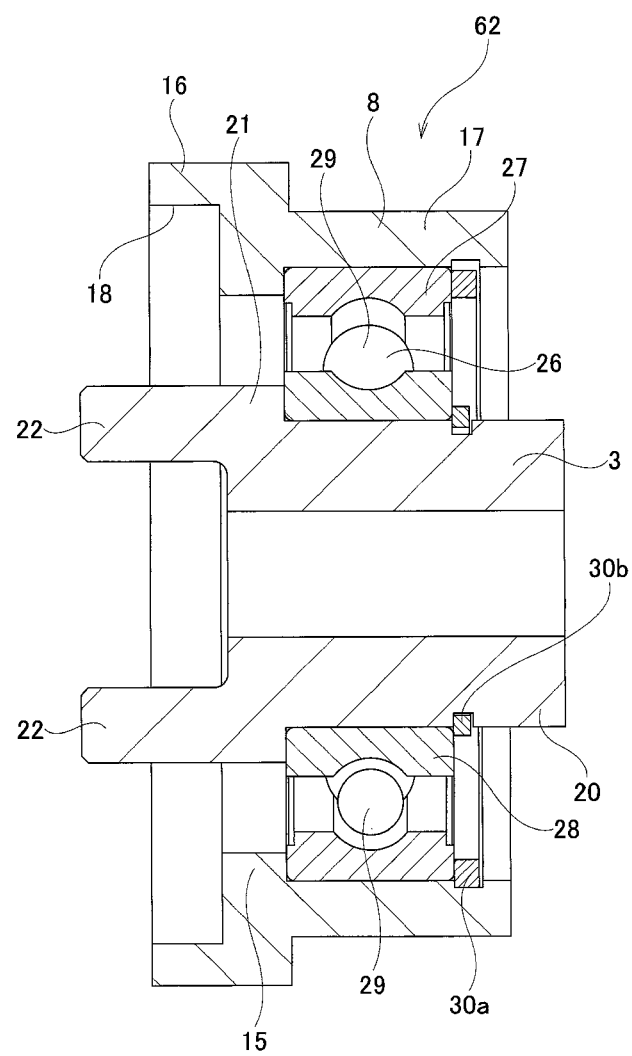
FIG. 12 is a cross-sectional view of an input-side assembly configured when assembling the reverse-input blocking clutch.

Further, an input-side assembly 62 as illustrated in FIG. 12 is obtained by rotatably supporting the input member 3 inside the input-side housing element 8 by the input-side radial rolling bearing 26.

Next, in a state where the phases of the pair of input-side engaging portions 22 of the input member 3 and the input-side engaged portions 50 of the pair of engaging elements 5 in the circumferential direction coincide, the output-side assembly 61 and the input-side assembly 62 are displaced toward each other in the axial direction. As a result, the inner diameter side fitting surface portion 14 of the output-side housing element 9 and the outer diameter side fitting surface portion 18 of the input-side housing element 8 are fitted together without looseness, and the pair of input-side engaging portions 22 are inserted into the input-side engaged portions 50. Then, the reverse-input blocking clutch 1 is assembled by coupling the input-side housing element 8 and the output-side housing element 9 to each other using coupling members.

In the reverse-input blocking clutch 1 of this example, the stopper member 58 prevents the pair of engaging elements 5 from being relatively displaced in the axial direction with respect to the output member 4. Therefore, as illustrated in FIG. 11, the output member 4, the pair of engaging elements 5, and the output-side housing element 9 can be formed into a subassembly as the output-side assembly 61. By displacing the output-side assembly 61 and the input-side assembly 62 in a direction toward each other in the axial direction, the inner diameter side fitting surface portion 14 and the outer diameter side fitting surface portion 18 are fitted together without looseness, and the pair of input-side engaging portions 22 of the input member 3 is inserted into the input-side engaged portions 50 of the pair of engaging elements 5 to combine the output-side assembly 61 and the input-side assembly 62.

Comparative Example

Figure 13:
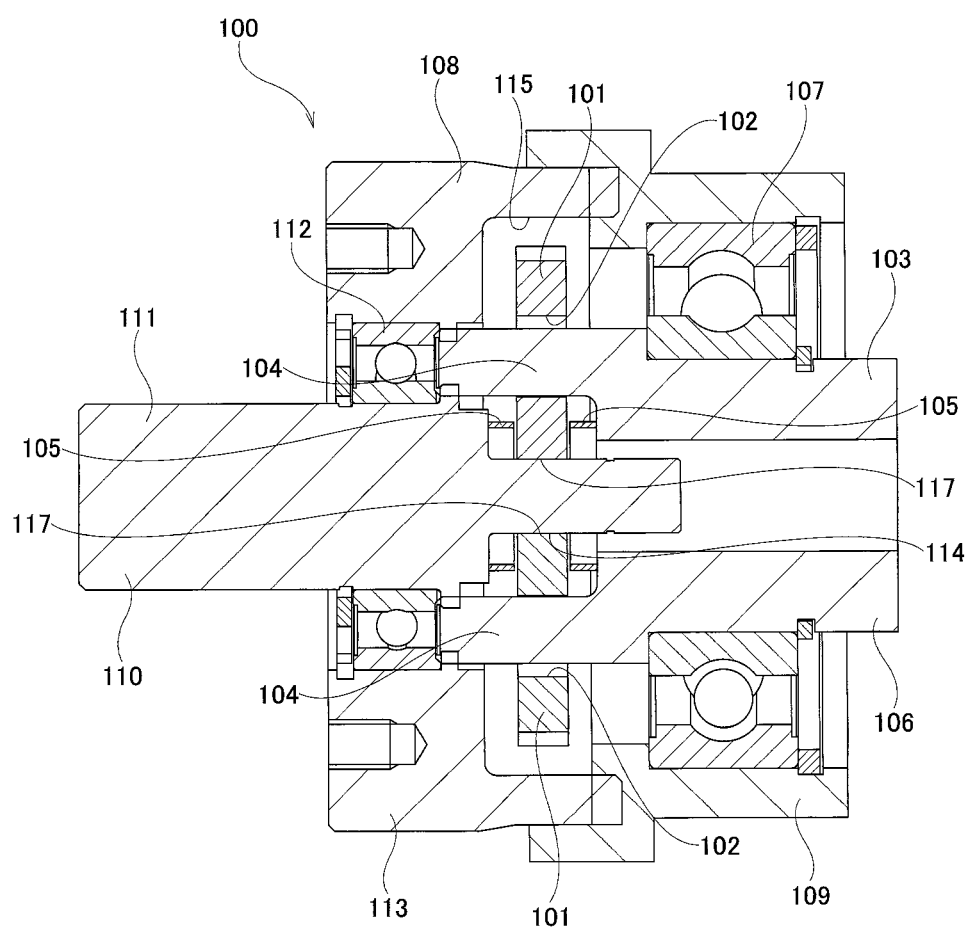
FIG. 13 is a cross-sectional view illustrating a reverse-input blocking clutch according to a comparative example of the present disclosure.
Figure 14:
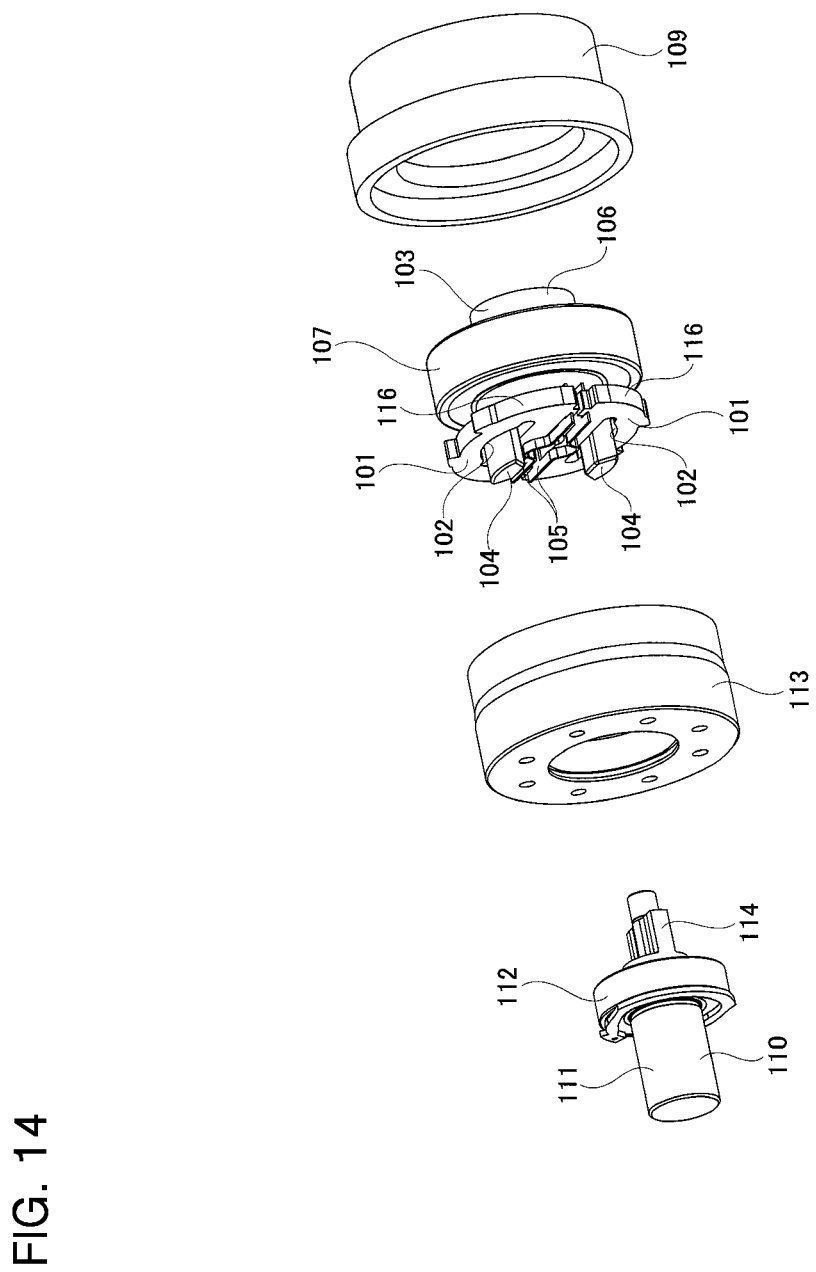
FIG. 14 is an exploded perspective view illustrating a reverse-input blocking clutch according to the comparative example.
Figure 15:
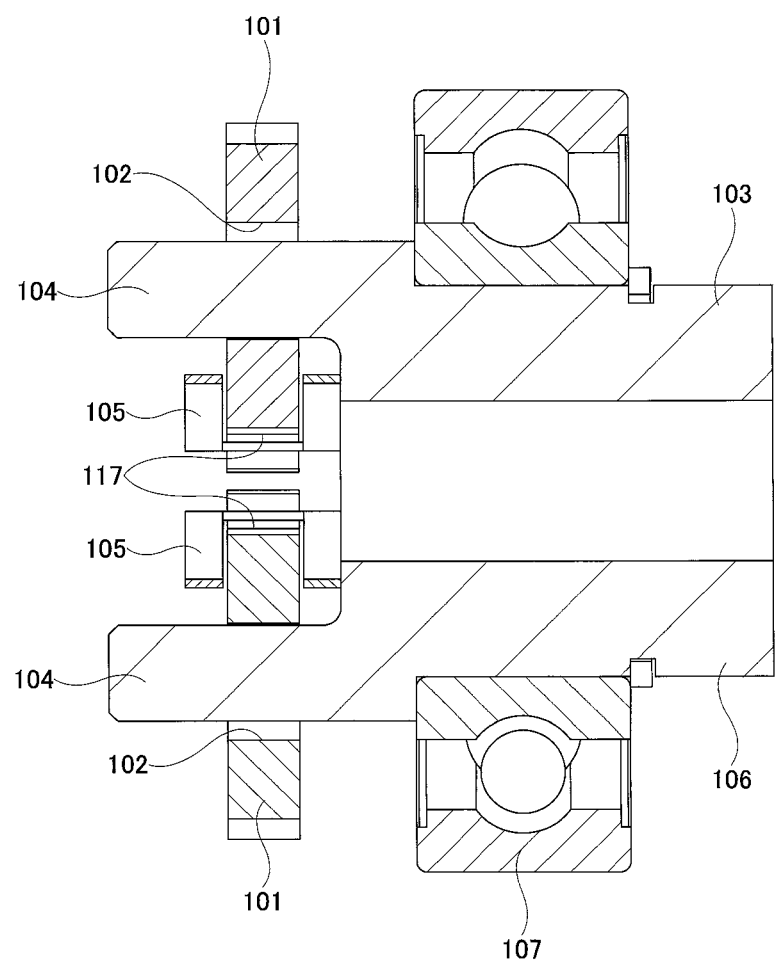
FIG. 15 is a cross-sectional view of a pair of engaging elements, an input member, a pair of leaf springs, and an input-side radial rolling bearing of the reverse-input blocking clutch according to the comparative example.

FIG. 13 to FIG. 15 illustrate a reverse-input blocking clutch of a comparative example in relation to the present disclosure. The reverse-input blocking clutch 100 of the comparative example does not include the pair of spacers 54, the stopper member 58, and a structure for attaching these to the reverse-input blocking clutch 100, however, other than that, its basic construction is similar to the reverse-input blocking clutch 1 of an example of an embodiment of the present disclosure.

When assembling the reverse-input blocking clutch 100, as illustrated in FIG. 14 and FIG. 15, a pair of input-side engaging portions 104 of the input member 103 is inserted into input-side engaged portions 102 of a pair of engaging elements 101, and a leaf spring 105 configuring an elastic member is arranged on the inside in the radial direction of each engaging element 101. Further, an input shaft portion 106 of the input member 103 is rotatably supported by an input-side radial rolling bearing 107 with respect to an input-side housing element 109 configuring a pressed member 108. In this way, an input-side assembly comprising a pair of engaging elements 101, an input member 103, a pair of leaf springs 105, an input-side radial rolling bearing 107, and an input-side housing element 109 is obtained.

Further, an output shaft portion 111 of an output member 110 is rotatably supported inside an output-side housing element 113 configuring a pressed member 108 by an output-side radial rolling bearing 112. In this way, the output member 110, the output-side radial rolling bearing 112, and the output-side housing element 113 are combined to obtain an output-side assembly.

Next, the input-side assembly and the output-side assembly are brought close to each other in the axial direction to insert an output-side engaging portion 114 of the output member 110 between a pair of leaf springs 105 arranged on the inside in the radial direction of the pair of engaging elements 101. At the same time, the pair of engaging elements 101 is arranged inside the pressed surface 115 provided on an inner peripheral surface of the output-side housing element 113 so as to bring pressing surfaces 116 provided on the outer side surfaces in the radial direction of the pair of engaging elements 101 face the pressed surface 115. Then, the pressed member 108 is configured by coupling and fixing the input-side housing element 109 and the output-side housing element 113, thereby obtaining the reverse-input blocking clutch 100.

When inserting the output-side engaging portion 114 between the pair of leaf springs 105, the pair of leaf springs 105 and the output-side engaging portion 114 cannot be visually confirmed from the outside. Due to this, the work of inserting the output-side engaging portion 114 between the pair of leaf springs 105 becomes troublesome, and the assembly cost may increase.

Further, although the pair of leaf springs 105 is elastically held between the output-side engaged portions 117 and the output-side engaging portion 114, each leaf spring 105 is not supported by any member so as not to be able to fall out. Therefore, in a state before inserting the output-side engaging portion 114 between the pair of leaf springs 105, these leaf springs 105 move in a direction toward each other, and the distance between the pair of leaf springs 105 may be narrowed. From this point of view as well, the work of inserting the output-side engaging portion 114 of the output member 110 between the pair of leaf springs 105 may become troublesome.

On the other hand, in the reverse-input blocking clutch 1 of an example of an embodiment of the present disclosure, when displacing the output-side assembly 61 and the input-side assembly 62 in a direction toward each other in the axial direction, the pair of input-side engaging portions 22 can be loosely inserted into the input-side engaged portions 50 as long as the phases in the circumferential direction of the pair of input-side engaging portions 22 and the input-side engaged portions 50 of the pair of engaging elements 5 coincide. That is, with the reverse-input blocking clutch 1 of this example, it is not necessary to insert the output-side engaging portion 114 between the pair of leaf springs 105 while increasing the distance between the pair of leaf springs 105 as in the method of assembling the reverse-input blocking clutch 100 of the comparative example. Therefore, with the reverse-input blocking clutch 1 of this example, assembly work can be facilitated and assembly efficiency can be improved.

In the reverse-input blocking clutch 100 of the comparative example, the pair of engaging elements 101 can be displaced in the axial direction by several millimeters with respect to the input member 103 and the output member 110. Due to this, there is a possibility that the engaging elements 101 incline in the axial direction. When the engaging elements 101 move toward outside in the radial direction while the engaging elements 101 inclined in the axial direction, the pressing surfaces 116 and the pressed surface 115 are locally brought into contact and bite occurs. This may result in an increase in the force required to switch from the locked or semi-locked state to the unlocked or semi-unlocked state, and plastic deformation may occur in the pressing surfaces 116 and/or the pressed surface 115.

On the other hand, in the reverse-input blocking clutch 1 of this example, the pair of engaging elements 5 is prevented from being inclined in the axial direction by preventing relative displacement of the pair of engaging elements 5 in the axial direction with respect to the output member 4 by the stopper member 58. As a result, switching operation of the output member 4 between the locked and semi-locked state or unlocked and semi-unlocked state can be performed stably.

REFERENCE SIGNS LIST

1 Reverse-input blocking clutch
2 Pressed member
3 Input member
4 Output member
5 Engaging element
6 Elastic member
7 Pressed surface
8 Input-side housing element
9 Output-side housing element
10 Small-diameter cylindrical surface portion
11 Large-diameter cylindrical surface portion
12 Connecting surface portion
13 Inward flange portion
14 Inner diameter side fitting surface portion
15 Side plate portion
16 Large-diameter cylindrical portion
17 Small-diameter cylindrical portion
18 Outer diameter side fitting surface portion
19 Screw hole
20 Input shaft portion
21 Input flange portion
22 Input-side engaging portion
23 Inner side surface in the radial direction
24 Outer side surface in the radial direction
25 Side surface in the circumferential direction
26 Input-side radial rolling bearing
27 Outer ring
28 Inner ring
29 Rolling elements
30a, 30b Retaining ring
31 Output shaft portion
32 Output flange portion
33 Output-side engaging portion
34 Small diameter shaft portion
38 Long side portion
39 Short side portion
40 Output-side radial rolling bearing
41 Outer ring
42 Inner ring
43 Rolling element
44a, 44b Retaining ring
45 Pressing surface
46 Notch
47 Concave portion
48 Convex portion
49 Flat surface portion
50 Input-side engaged portion 51 Flat surface
52 Arm portion
  52a Width direction plate piece
  52b Axial direction plate piece
  52c Notch
53 Connecting portion
54 Spacer
55 Through hole
56 Chamfer section
57 Corner R portion
58 Stopper member
59 Locking groove
60 Preliminary assembly
61 Output-side assembly
62 Input-side assembly
100 Reverse-input blocking clutch
101 Engaging element
102 Input-side engaged portion
103 Input member
104 Input-side engaging portion
105 Leaf spring
106 Input shaft portion
107 Input-side radial rolling bearing
108 Pressed member
109 Input-side housing element
110 Output member
111 Output shaft portion
112 Output-side radial rolling bearing
113 Output-side housing element
114 Output-side engaging portion
115 Pressed surface
116 Pressing surface
117 Output-side engaged portion

The invention claimed is:

1. A reverse-input blocking clutch including:
a pressed member having a pressed surface on an inner peripheral surface thereof;
an input member having at least one input-side engaging portion arranged on inside in a radial direction of the pressed surface and coaxially arranged with the pressed surface;
an output member having an output-side engaging portion arranged on inside in the radial direction of the pressed surface and on inside in the radial direction of the input-side engaging portion, arranged coaxially with the pressed surface, and rotatably supported inside the pressed member;
an engaging element having a pressing surface facing the pressed surface, an input-side engaged portion engageable with the input-side engaging portion, and an output-side engaged portion engageable with the output-side engaging portion, and arranged between the pressed surface and the output-side engaging portion with regard to a first direction which is a direction moving toward or away from the pressed surface so as to move in the first direction;
an elastic member elastically urging the engaging element in a direction that brings the pressing surface closer to the pressed surface with regard to the first direction; and
a displacement prevention member for preventing relative displacement with regard to an axial direction of the engaging element with respect to the output member;
when rotational torque is input to the input member, the engaging element displacing in a direction moving away from the pressed surface with regard to the first direction based on the input-side engaging portion engaging with the input-side engaged portion and transmitting rotational torque input to the input member to the output member by engaging the output-side engaged portion with the output-side engaging portion, and when rotational torque is reversely input to the output member, the engaging element pressing the pressing surface against the pressed surface so as to frictionally engage the pressing surface with the pressed surface based on the output-side engaging portion engaging with the output-side engaged portion, wherein
the pressed member has
an output-side housing element rotatably supporting the output member inside thereof and having the pressed surface on an inner peripheral surface thereof; and
an input-side housing element rotatably supporting the input member inside thereof and coupled and fixed to the output-side housing element.

2. The reverse-input blocking clutch according to claim 1, wherein
the displacement prevention member has a stopper member locked to the output member and facing a side surface in the axial direction of the engaging element directly or through another member.

3. The reverse-input blocking clutch according to claim 1, wherein
the elastic member is configured by a leaf spring elastically held between the output-side engaging portion and the engaging element.

4. The reverse-input blocking clutch according to claim 1, wherein
the engaging element is configured by a pair of engaging elements, and the input-side engaging portion is configured by a pair of input-side engaging portions.

5. A method for assembling a reverse-input blocking clutch,
the reverse-input blocking clutch including:
a pressed member having a pressed surface on an inner peripheral surface thereof;
an input member having at least one input-side engaging portion arranged on inside in a radial direction of the pressed surface and coaxially arranged with the pressed surface;
an output member having an output-side engaging portion arranged on inside in the radial direction of the pressed surface and on inside in the radial direction of the input-side engaging portion, arranged coaxially with the pressed surface, and rotatably supported inside the pressed member;
an engaging element having a pressing surface facing the pressed surface, an input-side engaged portion engageable with the input-side engaging portion, and an output-side engaged portion engageable with the output-side engaging portion, and arranged between the pressed surface and the output-side engaging portion with regard to a first direction which is a direction moving toward or away from the pressed surface so as to move in the first direction;
an elastic member elastically urging the engaging element in a direction that brings the pressing surface closer to the pressed surface with regard to the first direction; and
a displacement prevention member for preventing relative displacement with regard to an axial direction of the engaging element with respect to the output member;
when rotational torque is input to the input member, the engaging element displacing in a direction moving away from the pressed surface with regard to the first direction based on the input-side engaging portion engaging with the input-side engaged portion and transmit rotational torque input to the input member to the output member by engaging the output-side engaged portion with the output-side engaging portion, and when rotational torque is reversely input to the output member, the engaging element pressing the pressing surface against the pressed surface so as to frictionally engage the pressing surface with the pressed surface based on the output-side engaging portion engaging with the output-side engaged portion, the method, comprising steps of:

rotatably supporting the output member inside the pressed member, arranging the engaging element between the pressed surface and the output-side engaging portion, preventing relative displacement in the axial direction of the engaging elements with respect to the output member by the displacement prevention member, and elastically urging the engaging element in a direction that brings the pressing surface closer to the pressed surface with regard to the first direction by the elastic member, and moving the input member and the output member in a direction toward each other with regard to the axial direction, engaging the input-side engaging portion with the input-side engaged portion.

* * * * *